(12) United States Patent
Heron et al.

(10) Patent No.: US 12,342,248 B2
(45) Date of Patent: Jun. 24, 2025

(54) SYSTEM AND METHOD FOR COMMUNICATING A SPORTS MESSAGE

(71) Applicant: ARMILLA TECH LTD., Salmon Arm (CA)

(72) Inventors: Lance Heron, Salmon Arm (CA); Gerhard De Beer, Tucson, AZ (US)

(73) Assignee: ARMILLA TECH LTD., Salmon Arm (CA)

( * ) Notice: Subject to any disclaimer, the term of this patent is extended or adjusted under 35 U.S.C. 154(b) by 372 days.

(21) Appl. No.: 17/910,746

(22) PCT Filed: Mar. 10, 2021

(86) PCT No.: PCT/CA2021/050322
§ 371 (c)(1),
(2) Date: Sep. 9, 2022

(87) PCT Pub. No.: WO2021/179080
PCT Pub. Date: Sep. 16, 2021

(65) Prior Publication Data
US 2023/0105737 A1    Apr. 6, 2023

Related U.S. Application Data

(60) Provisional application No. 62/988,123, filed on Mar. 11, 2020.

(51) Int. Cl.
*H04W 4/12* (2009.01)
*H04B 1/3827* (2015.01)
*H04W 12/033* (2021.01)

(52) U.S. Cl.
CPC ............ *H04W 4/12* (2013.01); *H04B 1/3827* (2013.01); *H04W 12/033* (2021.01)

(58) Field of Classification Search
CPC ..... H04W 4/12; H04W 12/033; H04B 1/3827
See application file for complete search history.

(56) References Cited

U.S. PATENT DOCUMENTS

| 9,757,068 | B2 | 9/2017 | Cantrell |
| 10,080,950 | B2 | 9/2018 | Kelley |
| 10,223,430 | B2 | 3/2019 | McQuistan et al. |

(Continued)

*Primary Examiner* — Farid Seyedvosoghi
(74) *Attorney, Agent, or Firm* — Nexus Law Group LLP; Nicholas Toth; Otto Zsigmond

(57) ABSTRACT

A system and method for communicating a sports message includes: (a) an encased portable device that includes: (i) a portable computing device having a first processor for processing the sports message, and having a first display; and (ii) an enclosure for supporting the portable computing device and housing a first wireless transceiver; and (b) a wearable device comprising a second processor, a second display, and a second wireless transceiver, the first and second wireless transceivers being cooperatively operable to wirelessly transmit the sports message from the enclosure to the wearable device for display on the second display. The wearable device includes a heater between the second display and a battery. The first processor receives a user selection of the sports message after receiving one of: (i) user-defined category associated with the sports message, (ii) user-selected search criteria, and (iii) a digital file imported into the portable computing device.

20 Claims, 14 Drawing Sheets

(56) References Cited

U.S. PATENT DOCUMENTS

| | | |
|---|---|---|
| 10,532,266 B2 | 1/2020 | Genova |
| 2002/0132211 A1 | 9/2002 | August et al. |
| 2003/0144015 A1 | 7/2003 | Ham |
| 2007/0010335 A1* | 1/2007 | Al-Sabah ........... A63B 71/0669 |
| | | 463/47 |
| 2007/0290801 A1 | 12/2007 | Powell |
| 2009/0047645 A1* | 2/2009 | Dibenedetto .......... G16H 20/30 |
| | | 434/258 |
| 2010/0080388 A1 | 4/2010 | Daniel et al. |
| 2010/0080389 A1 | 4/2010 | Daniel et al. |
| 2010/0080390 A1* | 4/2010 | Daniel ................... A63B 71/06 |
| | | 380/271 |
| 2011/0246579 A1* | 10/2011 | Williams ............... H04B 1/385 |
| | | 709/206 |
| 2012/0035426 A1* | 2/2012 | Mielcarz .............. A61B 5/0015 |
| | | 600/300 |
| 2013/0139068 A1 | 5/2013 | Bowring |
| 2014/0070957 A1 | 3/2014 | Longinotti-Buitoni et al. |
| 2015/0130685 A1 | 3/2015 | Kim et al. |
| 2015/0189403 A1 | 7/2015 | Magi |
| 2016/0085216 A1 | 3/2016 | Wang et al. |
| 2017/0065872 A1 | 3/2017 | Kelley |
| 2017/0163795 A1 | 6/2017 | Kuang |
| 2017/0252633 A1 | 9/2017 | Wheeler |
| 2018/0324897 A1 | 11/2018 | Wu |
| 2019/0091545 A1* | 3/2019 | Genova ................ H04W 12/33 |

\* cited by examiner

← Sports Message Communication

Game Name ⌐
           ⎯116

Select Library
[ Play Library ▽ ]

Use Constructed Play Sheet ⊙⊃

Back          Next

FIG. 16

← Sports Message Communication

Confirm Players for the Game

| Defense Players | 5 selected |

- Wristband # 8    O D
- Wristband # 4    O D
- Wristband # 7    O D    118
- Wristband # 13    O D
- Wristband # 9    O D

| Offense Players | 5 selected |

- Wristband # 8    O D
- Wristband # 4    O D
- Wristband # 7    O D    120

Back          Confirm

FIG. 17

| New Game | | 00:00:08 | Defense▽ | Tab Play Call ▽ | ↑↓↑ |
|---|---|---|---|---|---|

Game Log　Play Library　Players　—142

| Down | Personnel | | | | Filter　X |
|---|---|---|---|---|---|
| Distance | Formation | Play | Category | | |
| ▫ 4 | 6 | 12 CatchTimmy | CatchTimi | Toss-Crack | All |
| ▫ All | All | 10 SpreadRT | InsideZoneKill | RunKillPass | Pass |
| | | | | | RunCanPass |
| ~92 | | | | | Run |
| | | | | 144← | Toss-Crack |
| ,174 | | | 186 | | RunKillPass |
| | | | | | (+) |

◯No Snap Count ◯On First Sound ⦿On1 ◯On2 ◯On3　178—
Cancel　　　　　　　　　End Drive　　　　　　　　　Call Play

FIG. 20

| 2nd new game | | 00:00:35 | Defense▽ | Tab Play Call ▽ | ↑↓↑ |
|---|---|---|---|---|---|

Game Log　Play Library　Players

| Event | Time | Play | Snap Count | Down | Distance | Result |
|---|---|---|---|---|---|---|
| Play Call 2 | 00:00:32 | CatchTimi | | 0 | 0 | ~Add |

| Down | Distance | Personnel | Formation | Play | Category |
|---|---|---|---|---|---|
| ▫ 4 | 6 | 12 | CatchTimmy | CatchTimi | Toss-Crack |
| ▫ All | All | 10 | SpreadRT | InsideZoneKill | RunKillPass |
| ▫ All | All | 10 | Instant New | NoPlay | Pass |
| ▫ All | All | 21 | Instant New | NoPlayRuf | RunKillPass |

182
~92　　　　　　　　　　　　　　　　　　(:D) (+)

186
Cancel　　　　　　　　End Drive—　　　　　　　Call Play

FIG. 21

| 2nd new game | | | 00:01:01 | | | |
|---|---|---|---|---|---|---|
| Game Log  Play Library  Players | | | | | | |
| Event | Time | Play | Snap Count | Down | Distance | Result |
| Drive 1 | 00:00:10 | | | | | |
| Play Call 1 | 00:00:22 | NoPlayRuf | | 1 | 10 | P +1st Down |
| Play Call 2 | 00:00:32 | CatchTimi | | 1 | 10 | P -85 |

Start Drive —188    200    End Game 184   194

| New Game | | | 00:04:25 | | | |
|---|---|---|---|---|---|---|
| Game Log  Play Library  Players | | | | | | |
| Event | Time | Play | Snap Count | Down | Distance | Result |
| Drive 1 | 00:00:36 | | | | | |
| Play Call 1 | 00:01:32 | CatchTimi | On3 | 1 | 10 | Add |
| Play Call 2 | 00:01:53 | InsideZoneKill | | 0 | 0 | Add |
| End Drive 1 | 00:03:22 | | | | | Report |
| Half Time | 00:03:41 | | | | 202 | Report |
| Drive 2 | 00:03:47 | | | | | |
| Play Call 3 | 00:04:02 | CatchTimi | | 1 | 10 | Add |
| End Drive 2 | 00:04:05 | | | | | Report |

Start Drive ⌒124    200 ⌒ End Game

SYSTEM AND METHOD FOR COMMUNICATING A SPORTS MESSAGE

CROSS-REFERENCE TO RELATED APPLICATIONS

This application claims priority of provisional application 62/988,123, filed Mar. 11, 2020, the entire contents of which are hereby incorporated by reference.

BACKGROUND OF THE INVENTION

1. Field of Invention

This invention relates to the industrial use of communications technology applicable to athletics and, in particular, to a system and method for communicating a sports message.

2. Description of Related Art

The conventional manner of play calling in sports and communicating information from coach to players on the sports field is typically by hand signal, play code display on a placard or sign, or by audio headphone to a player with an earpiece. However, there are many drawbacks with these conventional ways of sports communication and information dispersal. For example, hand signals are not always clear to certain players on the field of play and can also be intercepted by prying eyes on the opposing side of the field. Similarly, placards or signs are visible to opponents, thereby leaving the signal calling coach vulnerable to the interception of play calls or other information intended for the players of that coach's team. Furthermore, audio systems are prone to miscommunication due to loud crowds who may drown out the audio from a coach. These problems leave coaches of sports teams in a difficult spot when it comes to relaying vital game information or play calls to players on the field of player during a sports game or competition.

An object of the invention is to address the above shortcomings.

SUMMARY

The above shortcomings may be addressed by providing, in accordance with one aspect of the invention, a system for communicating a sports message. The system includes: (a) an encased portable device that includes: (i) a portable computing device having a first processor for processing the sports message, and having a first display; and (ii) an enclosure for supporting the portable computing device and housing a first wireless transceiver in electrical communication with the first processor; and (b) a wearable device comprising a second processor, a second display, and a second wireless transceiver in electrical communication with the second processor, wherein the first and second wireless transceivers are cooperatively operable to wirelessly transmit the sports message from the enclosure to the wearable device for display on the second display.

The wearable device may include a heater disposed adjacent to the second display for heating the second display. The wearable device may be operable to sense a temperature at the wearable device. The wearable device may be operable to heat the second display by the heater in response to the temperature. The system may be operable to wirelessly transmit encrypted communications between the encased portable device and the wearable device. The enclosure may further house an antenna for wireless communications between the first and second wireless transceivers. The first processor may be operable to receive a user selection of a name for the wearable device. The first wireless transceiver may be operable to wirelessly transmit the name to the second wireless transceiver. The enclosure may be dimensioned to support the portable computing device while maintaining visibility of the first display. The first display may be operable to display a plurality of the sports messages. The first processor may be operable to receive a first user-selection of the sports message from among the plurality of sports messages. The first processor may be operable to receive a second user-selection of one of: (i) a user-defined category associated with the sports message; (ii) a user-selected search criterion other than the user-defined category; and (iii) a digital file imported into a memory of the portable computing device. The first processor may be further operable to cause the first display to display the plurality of the sports messages in response to the second user-selection. The first processor may be operable to receive a third user-selection of an attribute and to associate the third user-selection with the first user-selection of the sports message.

In accordance with another aspect of the invention, there is provided a method of communicating a sports message. The method involves: (a) establishing wireless communications between an encased portable device and a wearable device when the encased portable device comprises a portable computing device having a first processor and a first display, when the encased portable device further comprises an enclosure supporting the portable computing device and housing a first wireless transceiver in electrical communication with the first processor, and when the wearable device comprises a second processor, a second display, and a second wireless transceiver in electrical communication with the second processor; (b) receiving by the first processor a first user-selection of the sports message; (c) wirelessly transmitting the sports message by the first wireless transceiver to the second wireless transceiver; and (d) displaying the sports message on the second display.

The method may further involve: (e) heating the second display by a heater disposed adjacent to the second display. Step (e) may involve sensing, by the wearable device, a temperature at the wearable device. Step (c) comprises encrypting the sports message into an encrypted communication and wirelessly transmitting the encrypted communication.

The method may further involve: (f) receiving by the first processor a user selection of a name for the wearable device. The method may further involve: (g) wirelessly transmitting the name from the first wireless transceiver to the second wireless transceiver. Step (b) may involve receiving by the first processor a second user-selection of one of: (i) a user-defined category associated with the sports message, (ii) a user-selected search criterion other than the user-defined category, and (iii) a digital file imported into a memory of the portable computing device. Step (b) may further involve displaying on the first display a plurality of the sports messages in response to the second user-selection when the enclosure is dimensioned to support the portable computing device while maintaining visibility of the first display. Step (b) may involve receiving by the first processor a second user-selection of an attribute. Step (b) may further involve associating the second user-selection with the first user-selection.

In accordance with another aspect of the invention, there is provided a system for communicating a sports message.

The system includes: (a) means for receiving a first user-selection of the sports message at an encased portable device; (b) wireless transmission means for wirelessly transmitting the sports message from the encased portable device to a wearable device; and (c) display means for displaying the sports message at the wearable device.

The system may further include means for heating the display means. The system may further include means for receiving a user-selection of a name for the wearable device. The wireless transmission means may be operable to transmit the name from the encased portable device to the wearable device. The system may further include means for receiving a second user-selection of an attribute and associating the second user-selection with the first user-selection.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention:

FIG. 16 is a graphical representation of a screen displayed on the handheld user device shown in FIG. 1, showing a value-entry box for entering a game name;

FIG. 17 is a graphical representation of a screen displayed on the handheld user device shown in FIG. 1, showing selection boxes for selecting wristband devices to be respectively worn by defense and offense players;

FIG. 20 is a graphical representation of a screen displayed on the handheld user device shown in FIG. 1, showing a Tab mode for searching the play library;

FIG. 21 is a graphical representation of a screen displayed on the handheld user device shown in FIG. 1, showing an Add-Result button;

FIG. 22 is a graphical representation of a screen displayed on the handheld user device of the system shown in FIG. 1, showing a result after it has been entered into the system at the handheld user device; and FIG. 23 is a graphical representation of a screen displayed on the handheld user device shown in FIG. 1, showing an End-Game button and a Report button.

DETAILED DESCRIPTION

A system for communicating a sports message includes: (a) means for receiving a first user-selection of the sports message at an encased portable device; (b) wireless transmission means for wirelessly transmitting the sports message from the encased portable device to a wearable device; and (c) display means for displaying the sports message at the wearable device.

The system may further include means for heating the display means. The system may further include means for receiving a user-selection of a name for the wearable device, the wireless transmission means being operable to transmit the name from the encased portable device to the wearable device. The system may further include means for receiving a second user-selection of an attribute and associating the second user-selection with the first user-selection.

Figure 1:
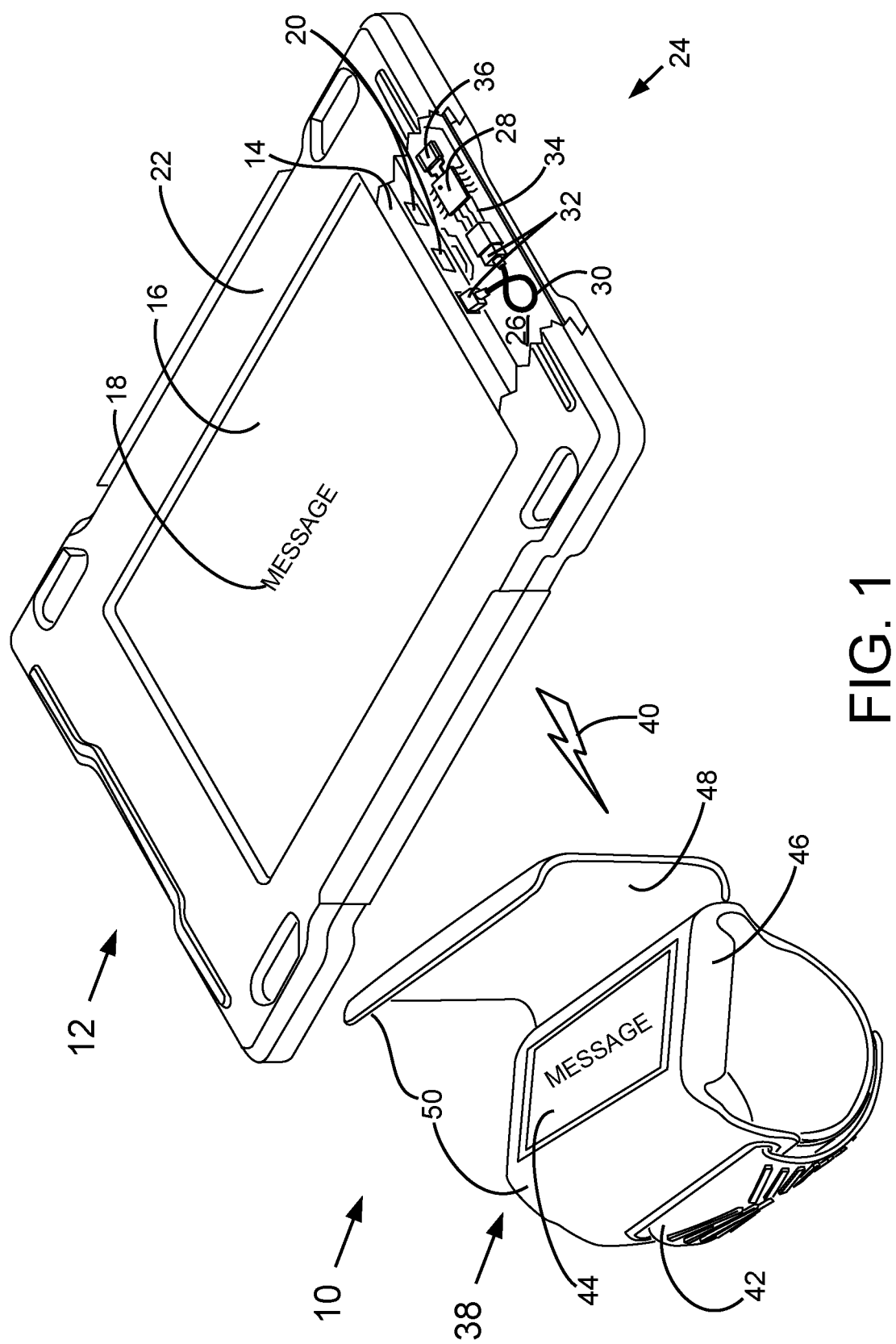
FIG. 1 is a perspective view of a system for communicating a sports message according to a first embodiment of the invention, showing a handheld user device and a wristband device.

Referring to FIG. 1, the system according to a first embodiment of the invention is shown generally at 10. The system 10 is operable to communicate sports-related messages between users of the system 10, such as between an individual such as the coach (or assistant coach) of a sports team and the athletic players of that sports team.

The system 10 includes an encased portable device, such as the handheld user device 12 shown in FIG. 1, which includes a portable computing device, such as the portable computer 14 that has a display 16 and at least one USB (Universal Serial Bus) port 20. The portable computer 14 is operable to cause its display 16 to display a sports-related message 18, which may include text, graphics, images such as icons or emoticons, videos, audio clips, or any other audio-visual media information in any combination. The sports message 18 is typically a play call, instruction(s) or other real-time information to assist the an athletic player during a sports event such as a practice or game. The play call may be for use in the game of North American style football or, without limitation, other sports, for example.

The handheld user device 12 also includes an enclosure, such as the casing 22 of FIG. 1. The casing 22 supports the portable computer 14 and also houses electronic circuitry such as the casing electronics 24, which are external to the portable computer 14.

As shown in FIG. 1, the casing electronics 24 includes a PCB (Printed Circuit Board) 26 supporting electronic devices such as a wireless transceiver 28 that is in electrical communication with the portable computer 14 via a cable 30 having connectors 32 and via electrical traces 34. In variations of embodiments, the electrical connection between the portable computer 14 and the wireless transceiver 28 may be implemented by one or more connectors without the cable 30; a cable or other wiring without the connectors 32; electrical circuit traces without the cable 30, without the connectors 32, or without either of the cable 30 and the connectors 32; by short-distance wireless transmission; other electrical connection means; or any combination thereof. In cases of wireless transmission between the portable computer 14 and the casing electronics 24, the wireless transceiver 28 may be implemented by a wireless repeater (not shown), for example, to achieve longer distance wireless transmission. In variations of the portable computer 14 and the casing electronics 24, any suitable connectorization may be employed, including using a port other than a USB port 20.

The casing electronics 24 also includes an antenna 36 in electrical communication with the wireless transceiver 28 for wireless transmission. While shown as a surface-mount antenna 36 in FIG. 1, any suitable implementation of the antenna 36 is possible, such as implementing the antenna 36 by specially dimensioned electrical traces on the PCB 26, by a connectorized antenna, such as a whip or loop antenna connected at the PCB 26, other antenna implementations, or any combination thereof for example.

While not shown in FIG. 1, the electrical circuitry 24 in variations of embodiments includes other electronic devices, such as a digital processor, digital memory, conditioning circuitry such as a filter, electrical noise reduction circuit, communications port circuit, other circuitry, or any combination thereof for example. In variations, various aspects of the electrical circuitry 24 may be incorporated or integrated into the wireless transceiver 28. For example, the wireless transceiver 28 may be implemented by an integrated circuit (IC) that includes a processor and/or a memory. In some embodiments, the wireless transceiver 28 is operable to buffer data received from the portable computer 14.

The system 10 also includes a wearable device such as the wristband device 38 shown in FIG. 1. The system 10 in the first embodiment is operable to cause the wireless transceiver 28 of the handheld user device 12 to wirelessly communicate the sports message 18 to the wristband device 38 via the wireless communication channel 40.

In the first embodiment, the wristband device 38 includes a strap 42 for strapping the wristband device 38 to a user's forearm or wrist (not shown), such as during a sports game. For example, the user may be an athletic player on a sports team that is participating in the sports game. In the first embodiment, the strap 42 ends are removable from and re-attachable to each other by a fastener, which in variations may be implemented by velcro, one or more clips, other fastening techniques, or any combination thereof for example.

The wristband device 38 includes a wristband display 44 for displaying the sports message 18 after it has been communicated from the handheld user device 12 to the wristband device 38. In some embodiments, the wristband display 44 is a flexible screen. In such embodiments, the wristband device 38 includes a flexible wristband housing 46 such that the flexible display 44 and at least the portion of the wristband housing 46 that surrounds the flexible display 44 is operable to conform to the shape of the wristband device 38 user when it is being worn. In other embodiments, the wristband display 44 is a rigid display and the wristband housing 46 rigidly holds the wristband display 44 in place.

Figure 2:
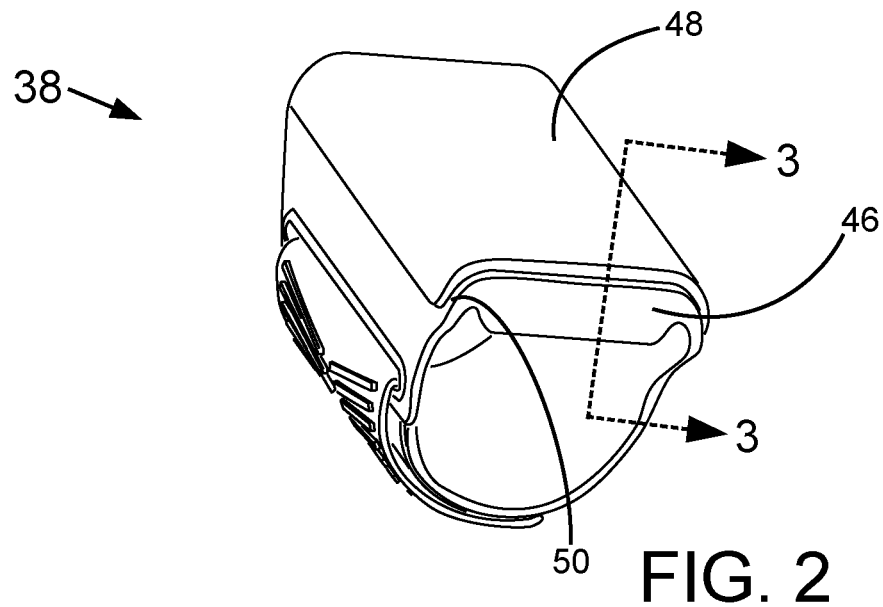
FIG. 2 is a perspective view of the wristband device shown in FIG. 1, showing a cover of the wristband device when the cover is closed.

In the first embodiment, the wristband device 38 includes a cover or waterproof pocket, such as the flap 48 shown in FIGS. 1 and 2. The flap 48 is hinged so that it can be opened (FIG. 1) or closed (FIG. 2). Opening the flap 48 renders the play call visible to the wristband device 38 user, while closing the flap 48 prevents others from viewing the play call and renders the wristband device 38 less obtrusive or fully unobtrusive during athletic activity. In the first embodiment, the flap 48 and the wristband housing 46 are cooperatively dimensioned to include a latching mechanism 50 to prevent the flap 48, when closed, from inadvertently opening during athletic activity. Furthermore, in some embodiments, the wristband device 38 includes a locking mechanism (not shown) for the flap 48. In some embodiments (not shown), the wristband device 38 includes a flap 48 detector, such as a magnetic switch, to detect when the flap 48 has been opened such that the system 10 is operable to positively detect that the athletic player has had the opportunity to view the sports message 18.

Figure 3:
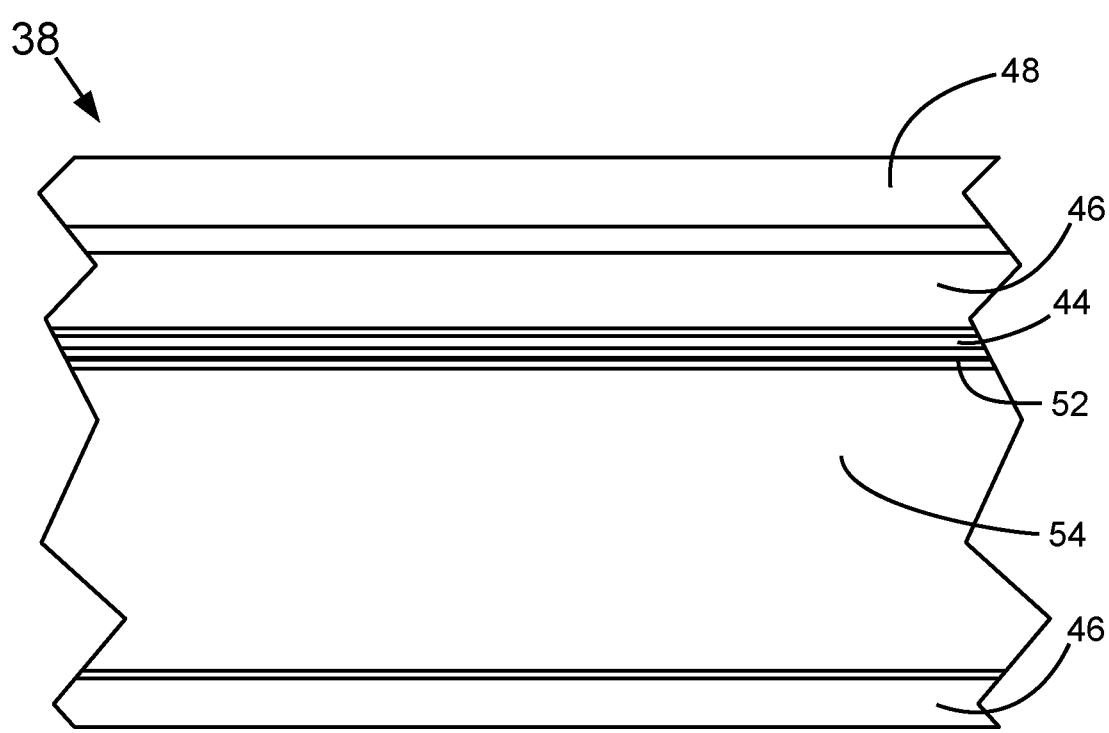
FIG. 3 is a sectional view along line 3-3 of FIG. 2 of a portion of the wristband device shown in FIG. 1, showing a heater disposed between a display and a battery of the wristband device.

Referring to FIG. 3, a sectional view of a portion of the wristband device 38 reveals inner components that are housed within the wristband housing 46. Such inner components are disposed under the flap 48, between respective upper and lower portions of the wristband housing 46, and adjacent to the wristband display 44. In particular, in the first embodiment, the wristband device 38 includes a heater 52 disposed adjacent to and at the inner side of the wristband display 44. The heater 52 is typically an electrically powered resistive-type heater 52 that is operable to heat the wristband display 44 during cold ambient temperatures to maintain proper operation of the wristband display 44. The heater 52 advantageously permits the wristband display 44 to operate in colder ambient temperatures than would otherwise be possible. This is important for outdoor sports events taking place in cold temperatures that would otherwise render the wristband display 44 inoperable. Operating the wristband display 44 closer to its optimal operating temperature improves the clarity of the sports message 18 being displayed.

The heater 52 for the wristband display 44 is disposed between the wristband display 44 and the main battery 54 of the battery-powered wristband device 38. The battery 54 may be any suitable battery of any suitable battery type, for example. In the first embodiment, the battery 54 is rechargeable and typically has a cycling lifespan (i.e. the time available at a given discharge rate before the battery 54 becomes fully discharged and must be recharged) that is temperature dependent. The heater 52 typically provides omni-directional heating and is advantageously disposed within the wristband device 38 to heat both the wristband display 44 and the battery 54, thereby shifting both the wristband display 44 and the battery 54 to or closer to their respective optimal operating temperatures. Operating the battery 54 closer to its optimal operating temperature advantageously improves the cycling lifespan of the battery 54 (except for the discharge rate attributed to powering the heater 52 itself by the battery 54).

Figure 4:
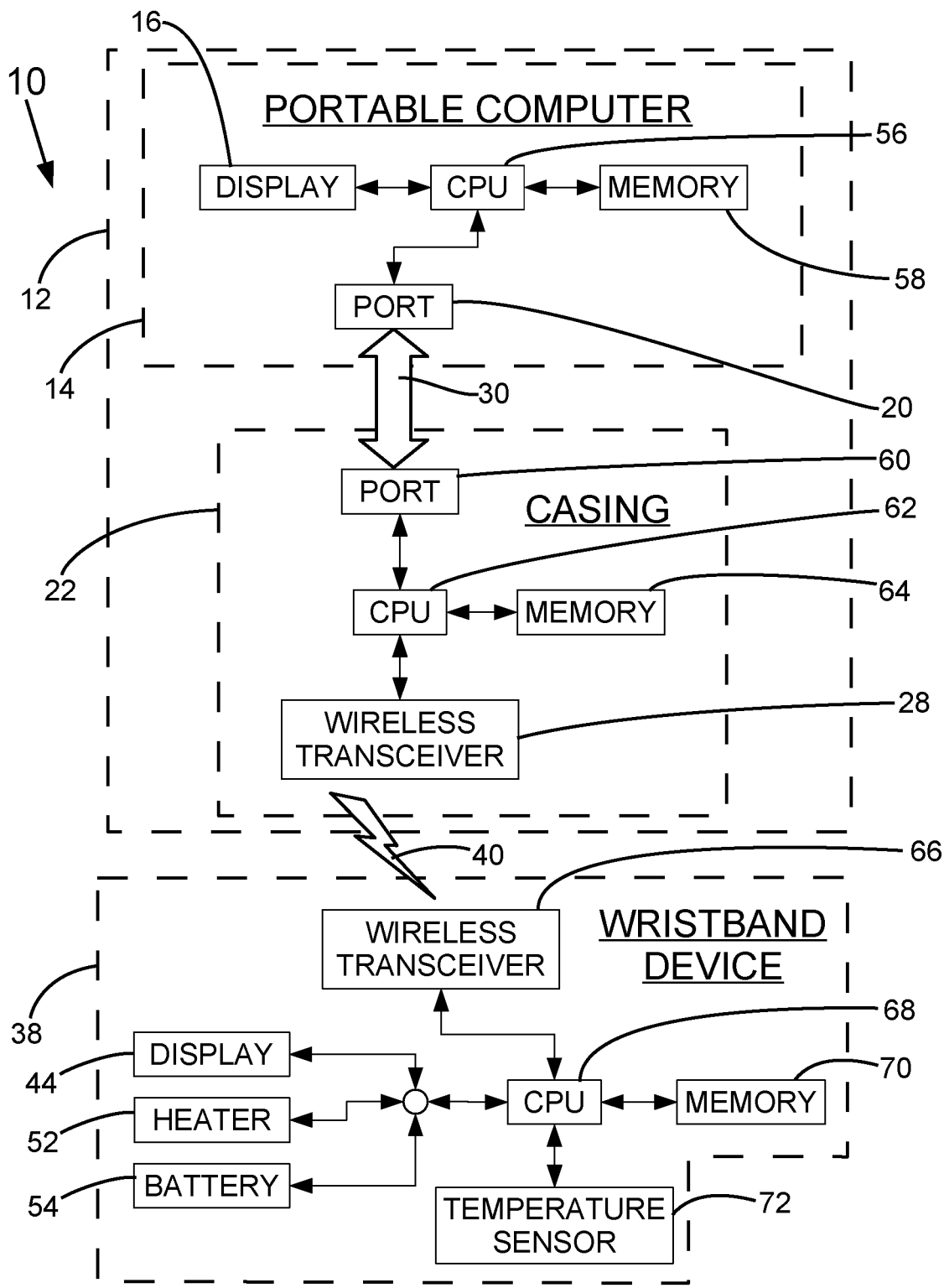
FIG. 4 is a block diagram of the system shown in FIG. 1, showing a portable computer and a casing of the handheld user device of FIG. 1.

Referring to FIG. 4, the portable computer 14 may be any computing device such as a general-purpose computer, laptop computer, notebook computer, tablet computer, personal digital assistant (PDA), personal communication device, smartphone, mobile telephone, or the like. The portable computer 14 is typically a commercially available electronic device that includes a processing circuit, such as a central processing unit (CPU) 56 for performing digital processing operations; and includes a memory circuit, such as the memory 58 for storing digital representations of data or other information, including user input and analysis results, and to store digital representations of program data or other information, including program code for directing operations of the CPU 56. In some embodiments, the portable computer 14 is a Fire™ tablet.

The CPU 56 in accordance with program instructions stored in the memory 58 is operable to cause data and other information to be displayed on the display 16. In the first embodiment, the display 16 is a touch screen such that the CPU 56 is operable to receive user input via the display 16 by the user touching on the display 16 a software button, icon, graphic, hyperlink, or the like.

The CPU 56 in accordance with further instructions stored in the memory 58 is operable in the first embodiment to transmit output data and other information via the USB port 20 and the cable 30 to a corresponding port 60 of the casing 22. Typically, the port 60 is a USB port 60 that is compatible with the USB port 20.

In the first embodiment, the casing 22 includes the wireless transceiver 28 for wirelessly communicating data and other information. In some embodiments, the electronic circuitry 24 housed by the casing 22 includes a casing CPU 62 and a casing memory 64. The CPU 62 in conjunction with the casing memory 64 provide data buffering, for example. In some embodiments, one or both of the CPU 62 and the memory 64 is integrated into the wireless transceiver 28.

In the system 10 of the first embodiment, the casing 22 and the wristband device 38 are in wireless communication with each other via the wireless communication channel 40 such that data or other information transmitted by one of the wireless transceiver 28 of the casing 22 and the corresponding wireless transceiver 66 is received by the other of the wireless transceivers 28 and 66.

The data or other information received by the wireless transceiver 66 of the wristband device 38 is processed by a wristband CPU 68 and/or stored by the wristband memory 70. The wristband CPU 68 in accordance with instructions stored in the wristband memory 70 and under the power of the battery 54 is operable to control the operations of the wristband display 44, the heater 52, and a temperature sensor 72. For example, the wristband device 38 is operable to activate the heater 52 when the temperature sensor 72 indicates the ambient temperature is at or below a predetermined threshold temperature, and is operable to de-activate the heater 52 when the temperature sensor 72 indicates the ambient temperature is at or above the same or another predetermined threshold temperature. In some embodiments, the wristband CPU 68 is operable to activate and de-activate the heater 52 in accordance with a programmed duty cycle of any suitable duty-cycle period and any suitable switching speed. In some embodiments, the wristband CPU 68 is operable to adjust the electrical current intensity powering the heater 52 in response to the temperature, or change in temperature, as received from the temperature sensor 72.

While FIG. 4 shows the temperature sensor 72 as part of the wristband device 38, in some embodiments the ambient temperature is determined externally to the wristband device 38, such as being determined by the portable computer 14 and/or the casing electronics 24 and communicated to the wristband device 38 via the wireless communication channel 40. Additionally or alternatively, the wristband device 38 may be operable to activate and/or de-activate the heater 52 in response to user input received at the wristband device 38. For example, whenever the wearer of the wristband device 38 is having difficulty viewing data or other information displayed on the wristband display 44, the wearer can manually instruct (e.g. press a button at the wristband device 38) the wristband CPU 68 to activate the heater 52 or operate the heater 52 at a higher power level.

Each of the CPU 56, casing CPU 62, and wristband CPU 68 may be implemented in any suitable manner including by one or more integrated circuits (IC) for digital processing. Each of the memory 58, casing memory 64, and wristband memory 70 may be implemented in any suitable manner including being implemented as one or more Read-Only Memory (ROM), Random-Access Memory (RAM), variations and combinations thereof, and may be operable to store digital representations as volatile memory, non-volatile memory, dynamic memory, etc. or any combination thereof.

The system 10 is advantageously operable to effect wireless communications between the casing 22 and the wristband device 38 without reliance on telecommunications infrastructure such as cellular telephone, Wi-Fi™, Local-Area Network (LAN) infrastructure, or other infrastructure that may not be available at a given sports field. In variations of embodiments, however, any commercially available telecommunications infrastructure and/or protocol(s) or combinations thereof may be employed by the system 10, including employing Bluetooth™, cellular telephone, Wi-Fi™, Personal Area Networks (PAN), LAN, Wide Area Networks (WAN) or other communications technology. In some embodiments, the system 10 is operable to switch between various communications technology automatically (e.g. dependent on availability at any particular location and time) or by user selection.

Method of Operation

Figure 5:
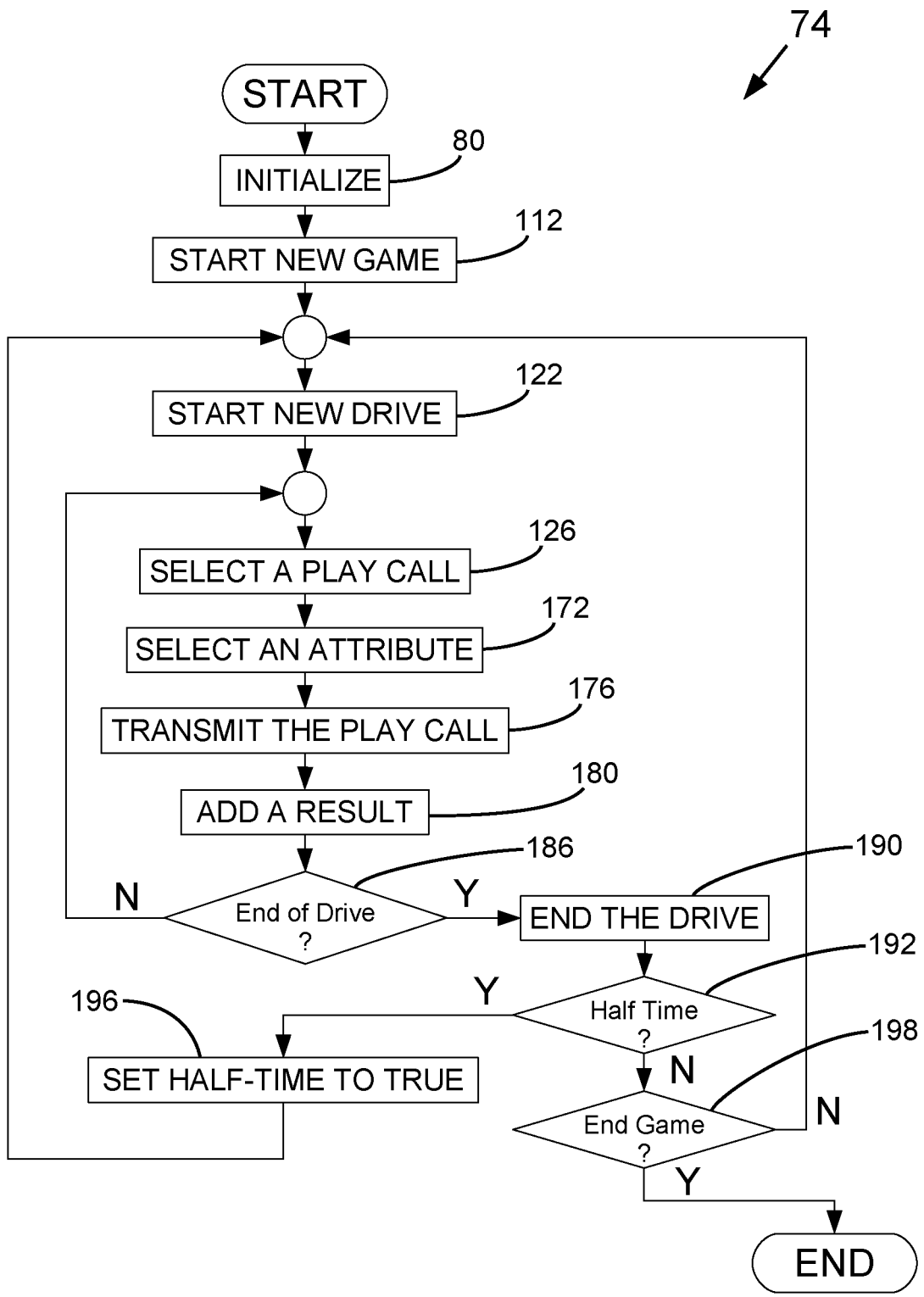
FIG. 5 is a flow diagram of a method of operation of the system shown in FIG. 1, showing a step of transmitting a play call from the handheld user device to one or more wristband devices.
Figure 6:
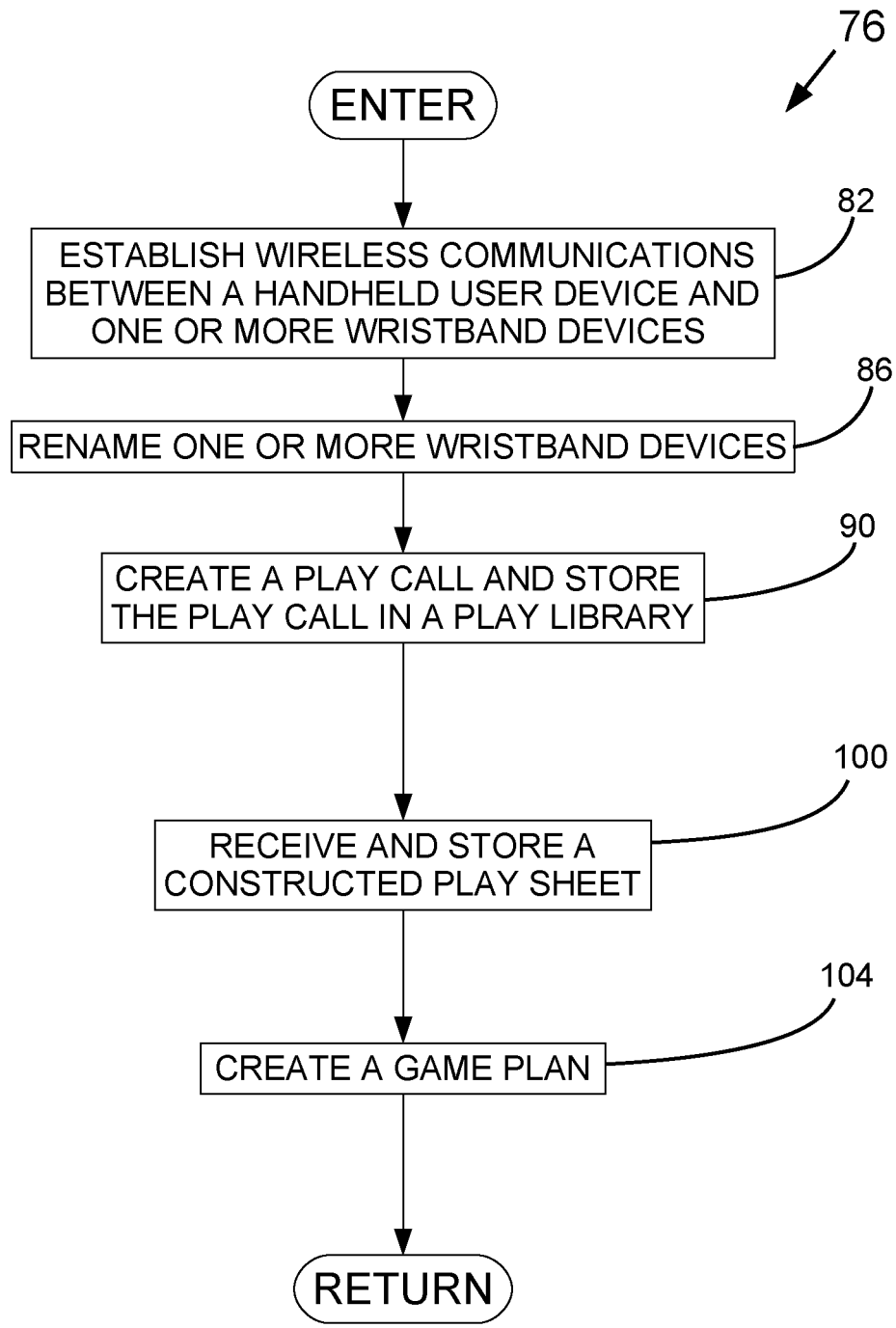
FIG. 6 is an exemplary method for performing the step of initializing shown in FIG. 5, showing the step of creating a game plan.
Figure 7:
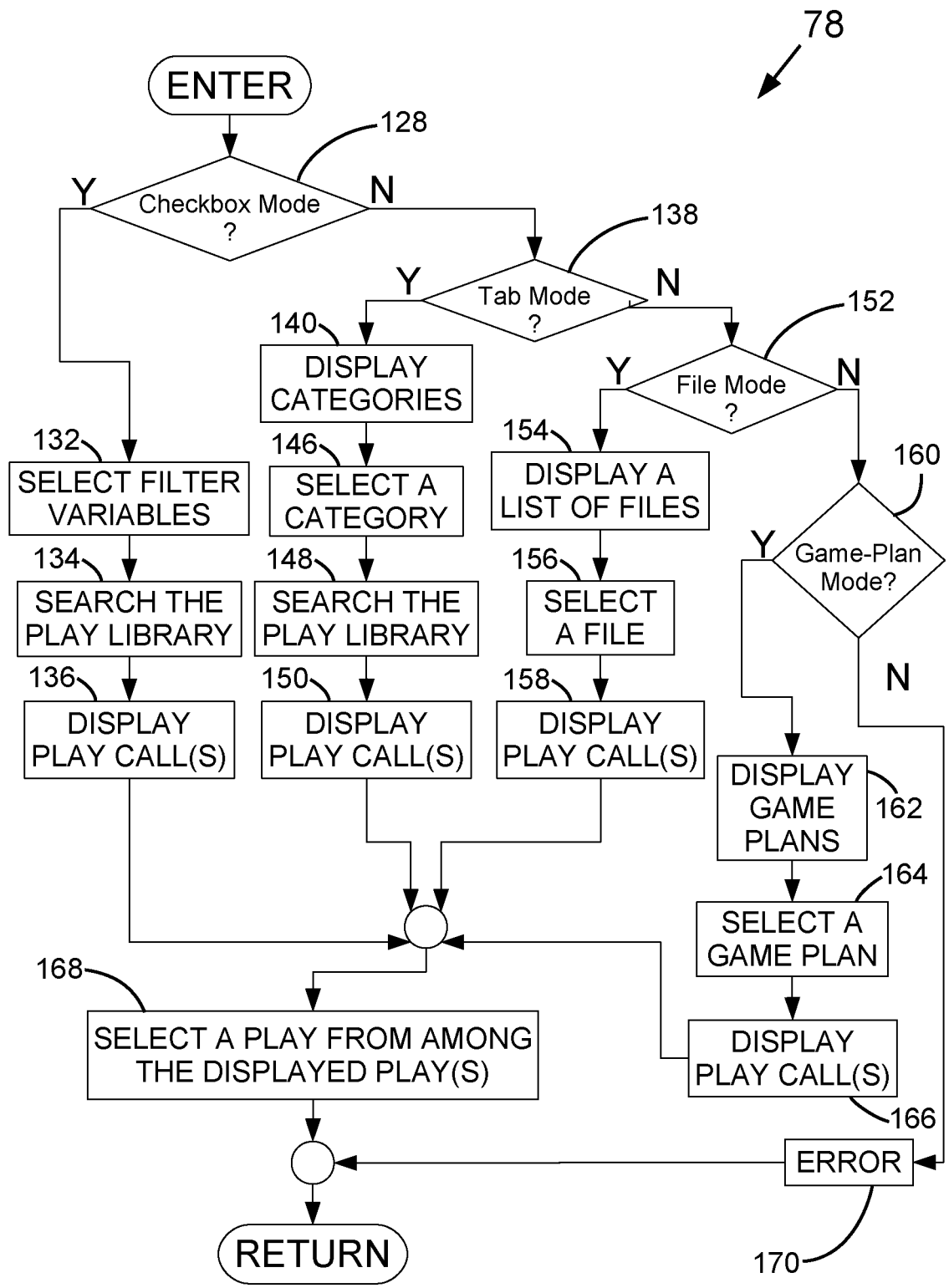
FIG. 7 is an exemplary method for performing the step of selecting a play call shown in FIG. 5, showing multiple instances of the step of displaying play call(s)

Referring to FIGS. 4 to 7, the memory 58 in accordance with the first embodiment of the invention contains blocks of code comprising computer executable instructions for directing the CPU 56 to perform the steps of the methods 74 (FIG. 5), 76 (FIG. 6), and 78 (FIG. 7). When electrical power is being supplied to the CPU 56 and the memory 58, the CPU 56 is first directed to begin executing the instructions of the method 74 at the block 80. Block 80 then directs the CPU 56 to perform an initialization routine.

Referring to FIG. 6, an exemplary method for directing the CPU 56 to perform steps of block 80 (FIG. 5) is shown generally at 76. Method 76 begins execution at block 82, which directs the CPU 56 to establish a wireless communications connection between the handheld user device 12 and one or more wristband devices 38. In the first embodiment, establishing the connections involves scanning for all wristband devices 38 that are within a wireless range of the handheld user device 12, such as by broadcasting a command SCAN and waiting a pre-determined amount of time for an acknowledgment command SCAN_ACK to be received from each of the plurality of wristband devices 38.

Typically, the scan acknowledgment includes an identification of the responding wristband device 38. After establishing communications, block 82 then directs the CPU 56 to cause the portable computer 14 to display a list of connected wristband devices 38 on the display 16 as shown in FIG. 8.

Figure 9:
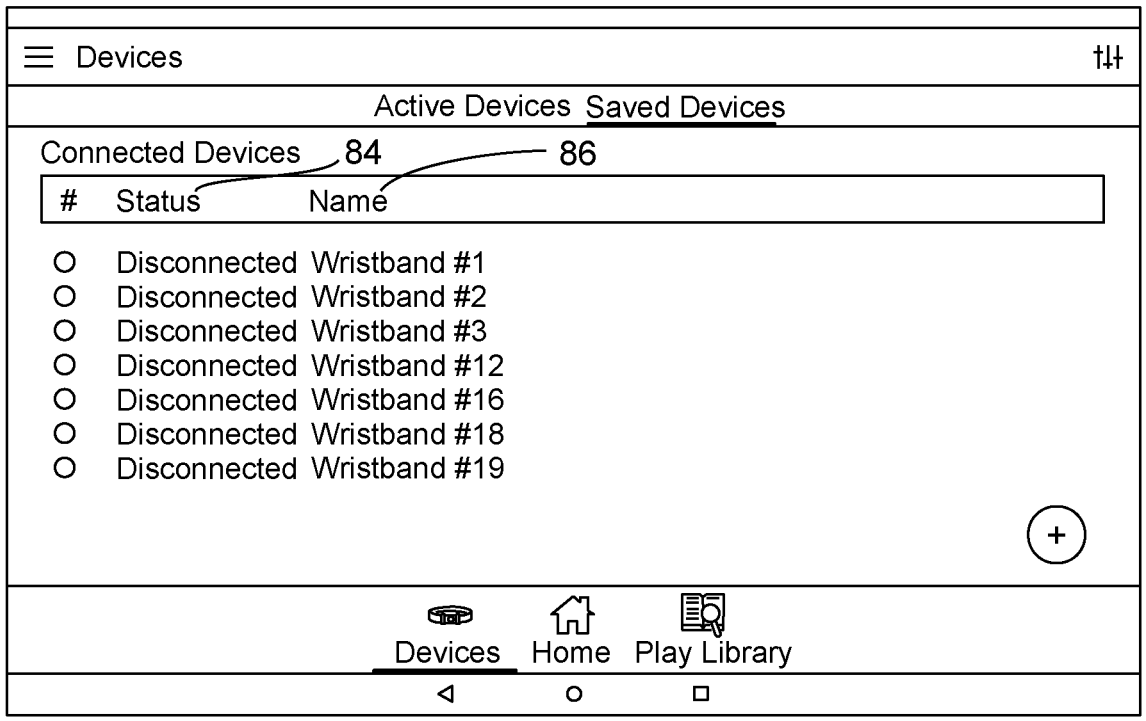
FIG. 9 is a graphical representation of a screen displayed on the handheld user device shown in FIG. 1, showing respective names of a plurality of wristband devices.

Referring to FIG. 9, the system 10 is also operable to store in the memory 58 (and/or casing memory 64) identifications of all previously connected wristband devices 38 and to show on the display 16 a list of such saved devices that are currently disconnected.

Figure 8:
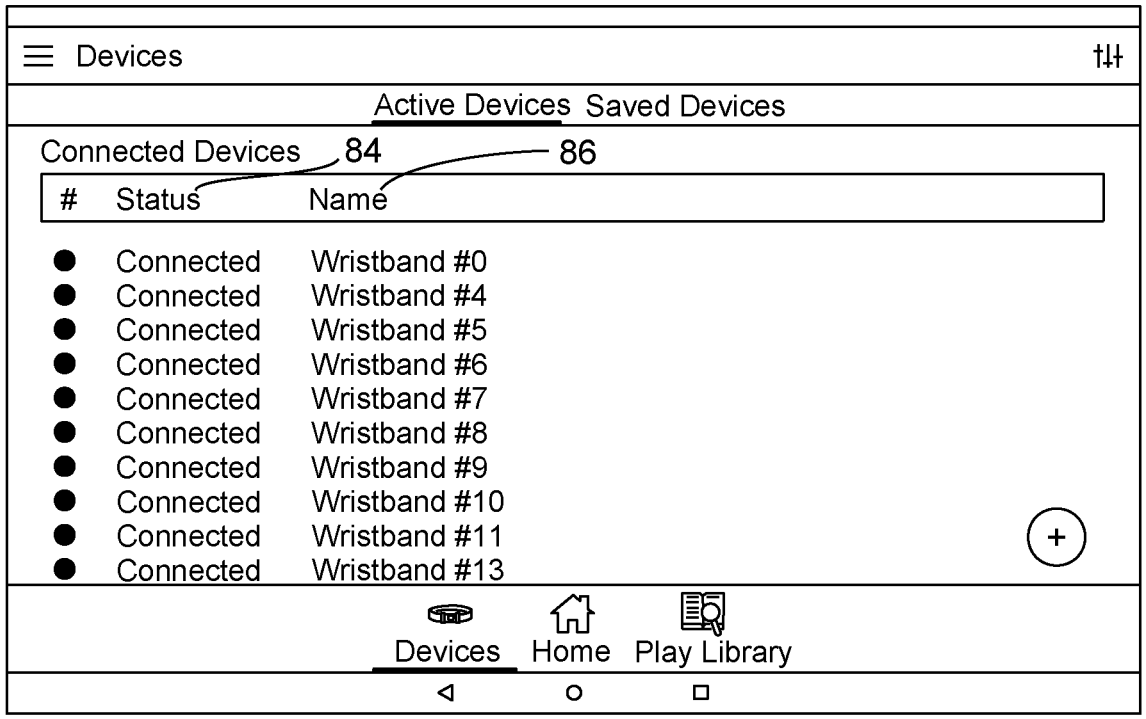
FIG. 8 is a graphical representation of a screen displayed on the handheld user device shown in FIG. 1, showing a connection status.

A connection status 84 is shown on the display 16 in association with the identification, such as the name 88 shown in FIGS. 8 and 9, of each listed wristband device 38. In the first embodiment, the connection status 84 at any given time is either Connected (FIG. 8) or Disconnected (FIG. 9).

Referring to FIGS. 6, 8, and 9, block 86 directs the CPU 56 to receive as user input, if any, a new user-selected name 88 for a given wristband device 38 and to store the new name 88 in association with the identification of the given wristband device 38 in the memory 58 (and/or casing memory 64). In some embodiments, the system 10 is operable to cause the handheld user device 12 to transmit the new name 88 to the given wristband device 38, such as by using a command SET_NAME, and waiting a predetermined amount of time to receive from the wristband device 38 an acknowledgment command SET_NAME_ACK indicating that the wristband device 38 has successfully stored its new name in its wristband memory 70. In the first embodiment, the system 10 is operable to permit a user of the handheld user device 12 to not only rename but also to delete or add identifications of wristband devices 38 from the memory 58 (and/or the casing memory 64).

The operability of the system 10 to uniquely identify each wristband device 38 advantageously allows multiple (e.g. two) teams to play sports at the same time on the same sports field without sports messages 18 becoming crossed or otherwise inadvertently appearing on the wrong wristband device 38. Furthermore, the system 10 is operable to avoid wireless-communication interference between opposing sports teams at the same sports field.

Figure 10:
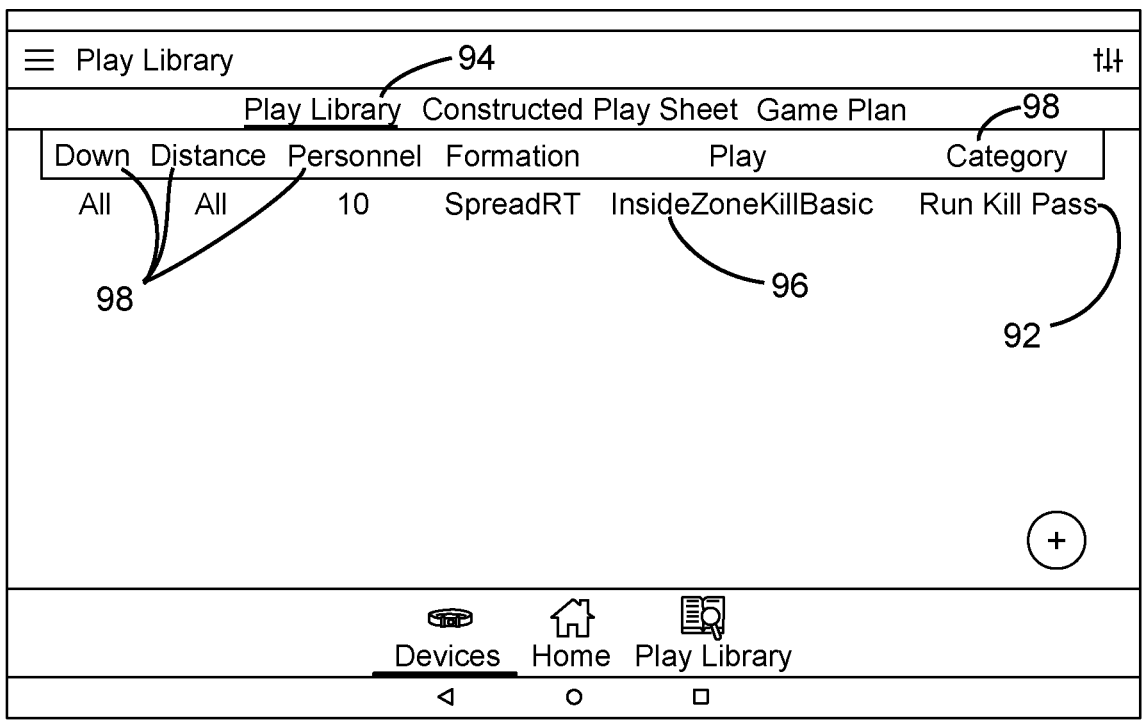
FIG. 10 is a graphical representation of a screen displayed on the handheld user device shown in FIG. 1, showing the display of a play call and its play-call parameters.
Figure 11:
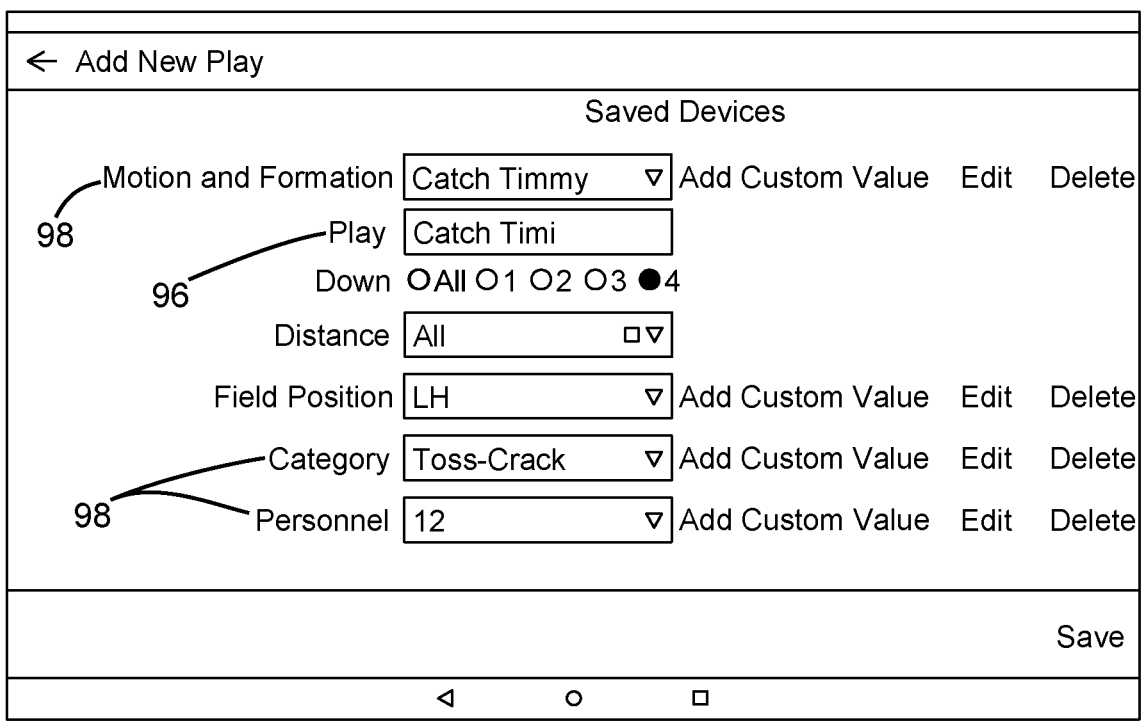
FIG. 11 is a graphical representation of a screen displayed on the handheld user device shown in FIG. 1, showing a dialog box for entering user-selected values of play-call parameters.
Figure 12:
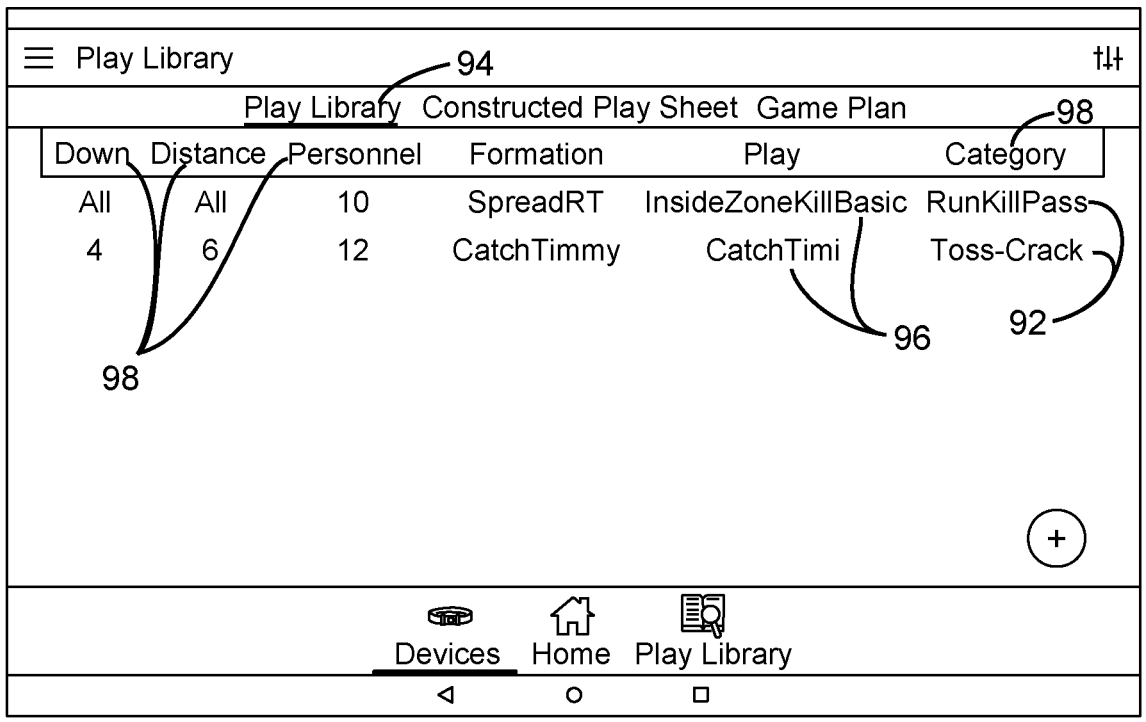
FIG. 12 is a graphical representation of a screen displayed on the handheld user device shown in FIG. 1, showing a list of play calls saved in a play library.

Referring to FIG. 6, and 10 to 12, block 90 directs the CPU 56 to receive as user input, if any, a new play call 92 and to store the play call 92 in a database, such as the play library 94 shown in FIG. 10, of the memory 58 (and/or casing memory 64). In the first embodiment, the play call 92 is identified by a name of the play 96 (e.g. 31 INSIDE ZONE KILLL BASIC) and includes associated parameters 98 having user-selectable values. As shown in FIG. 11, such play-call parameters 98 in the first embodiment are Motion and Formation, Down, Distance, Field Position, Category, and Personnel. When the user-selected values are saved (FIG. 11), the process returns to displaying the play library 94 (e.g. FIG. 12) and its play calls 92.

Figure 13:
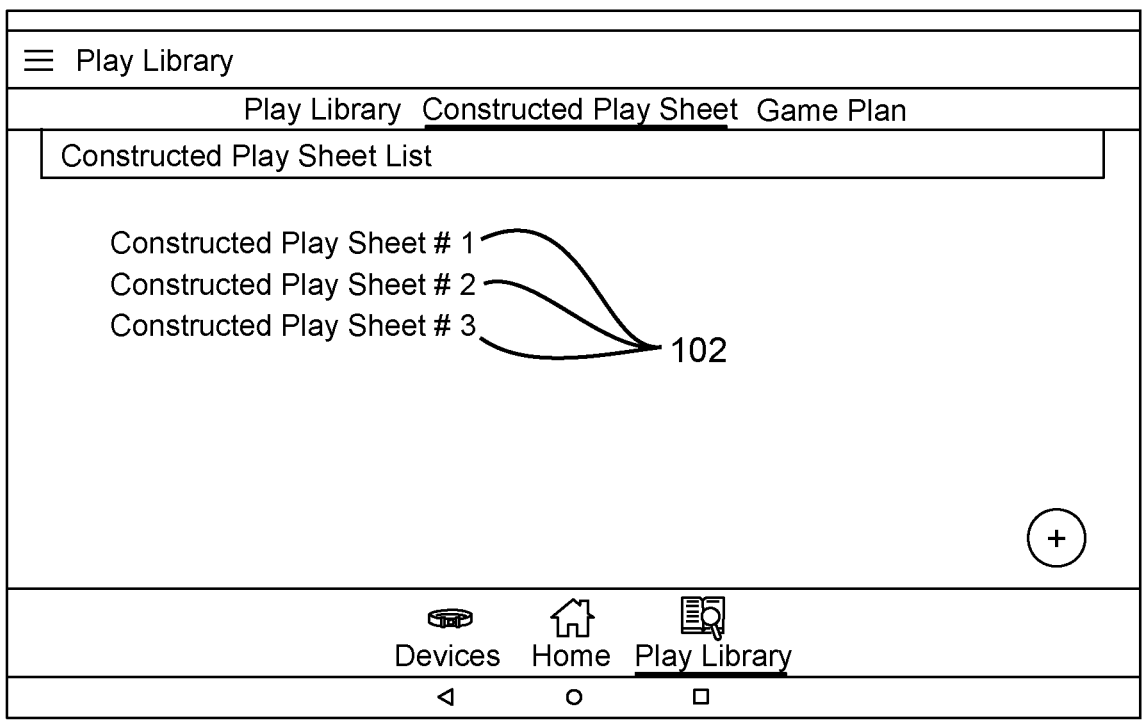
FIG. 13 is a graphical representation of a screen displayed on the handheld user device shown in FIG. 1, showing a list of constructed play sheets.

Referring to FIGS. 6, and 13, block 100 directs the CPU 56 to receive as an input file, if any, a file containing one or more pre-defined play calls 92 (FIGS. 10 to 12), such as the Constructed Play Sheet 102 shown in FIG. 13, and to store the received input file in a database of the memory 58 (and/or casing memory 64). The system 10 in variations is operable to receive and parse input files having a variety of file formats, such as CSV, XML, JSON, XLS, XLSX, comma-separated values file, etc., for example. In the first embodiment, the CPU 56 is directed to receive a CSV file and to store it as the Constructed Play Sheet 102. While receiving the Constructed Play Sheet 102 into memory is described herein in respect of block 100 of FIG. 6, in general any number of Constructed Play Sheets 102 may be received in response to user input at any time during any of the methods 74 to 78 (FIGS. 5 to 7). In the first embodiment, the system 10 is operable to delete and rename the Constructed Play Sheet 102. In some embodiments, the system 10 is operable to edit the Constructed Play Sheet 102, such as editing at the portable computer 14.

Figure 14:
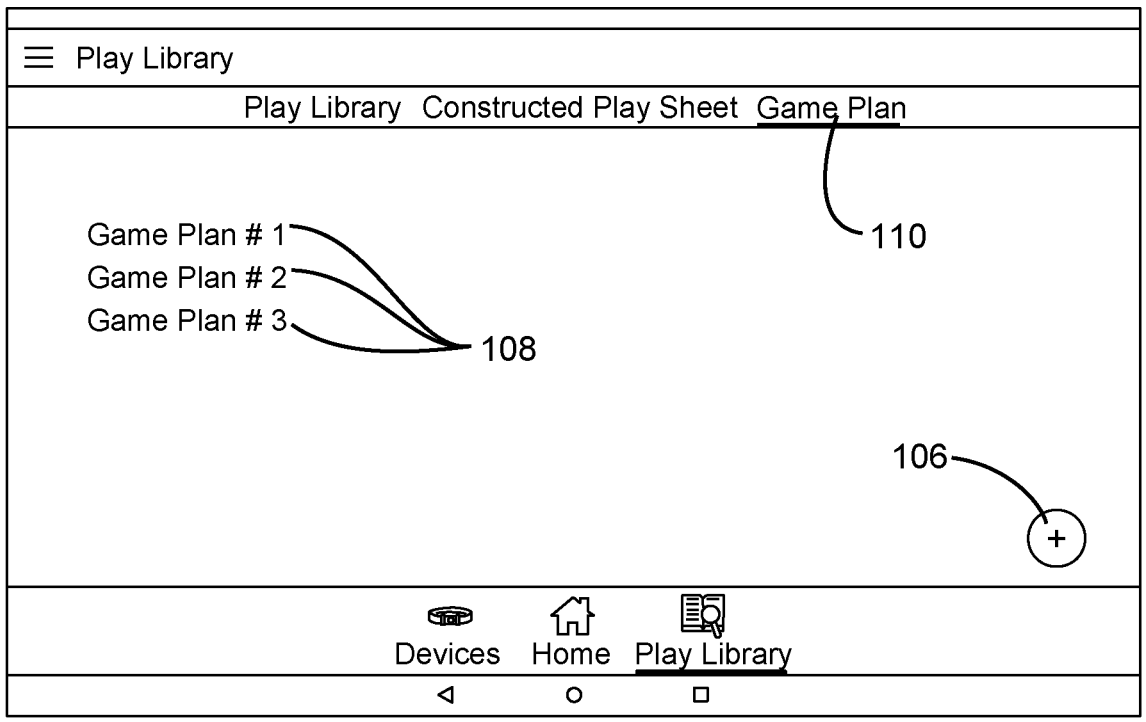
FIG. 14 is a graphical representation of a screen displayed on the handheld user device shown in FIG. 1, showing a list of game plans in a game-plan library.

Referring to FIGS. 6 and 14, block 104 directs the CPU 56 to receive as user input, if any, the selection of an add icon 106 to create a new game plan 108 and store the game plan 108 in the memory 58 (and/or casing memory 64) in association with a game-plan library 110 and for display on the display 16. A game plan 108 is a list of play calls 92, which may be an ordered list for example. Typically, a coach will prepare the game plan 108 in advance of a sports game to include a number of play calls 108, such as in the manner of a short-list of play calls 108, that are expected to be used during the sports game.

After block 104 has been executed, the CPU 56 is then directed to return to method 74 of FIG. 5. In variations of embodiments, a variety of other housekeeping operations of the system 10 may be performed by the CPU 56 under the direction of block 80. Blocks 86, 90, 100, and 104 of FIG. 6 are user-selectable blocks that each may or may not be invoked by the user at any given time.

Referring back to FIG. 5, after block 80 has been executed block 112 directs the CPU 56 to receive user input, if any, to create a new game and to start the new game in response to user input.

Figure 15:
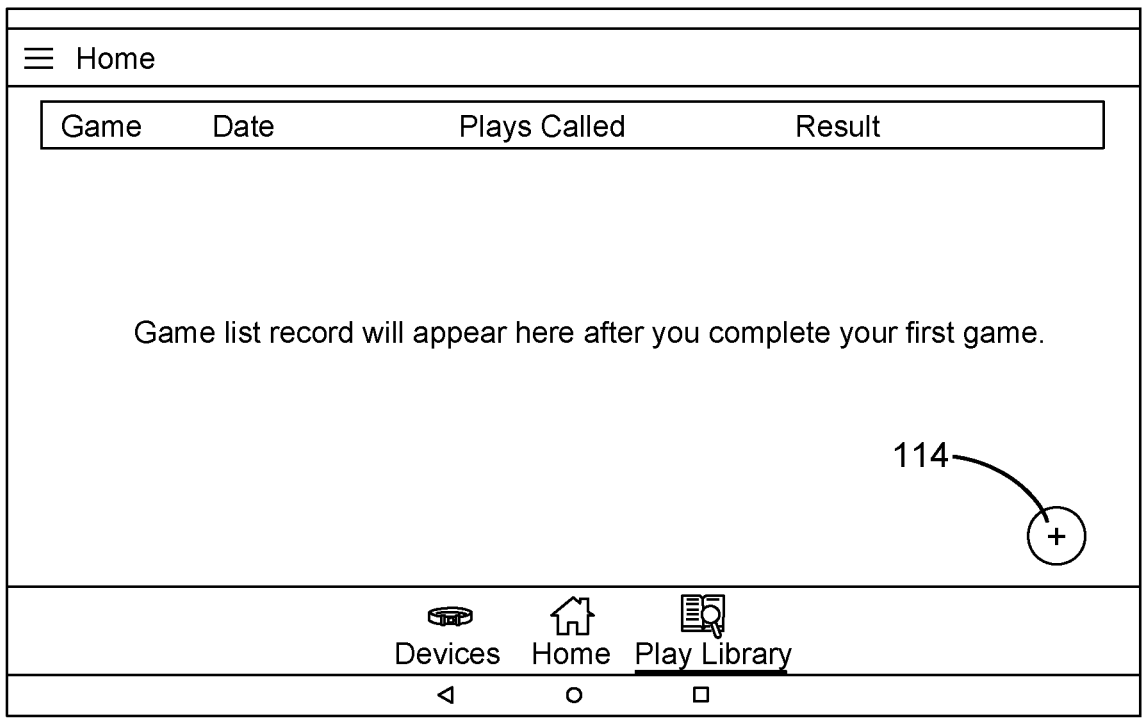
FIG. 15 is a graphical representation of a screen displayed on the handheld user device shown in FIG. 1, showing a button for adding a new game.

Referring to FIGS. 5 and 15 to 18 related to the first embodiment, receiving user input to start the new game involves receiving a user invocation of an Add New Game button 114 (FIG. 15). Upon receiving the user input, the CPU 56 is directed to display a value-entry box for a new Game Name 116 (FIG. 16). The CPU 56 is then directed to display selection boxes 118 (FIG. 17) for selecting the wristband devices 38 associated with the athletic players (defense and offense) participating in the sports game. When a user is satisfied with their selection(s), the user can select the button 120 for Confirm.

Figure 18:
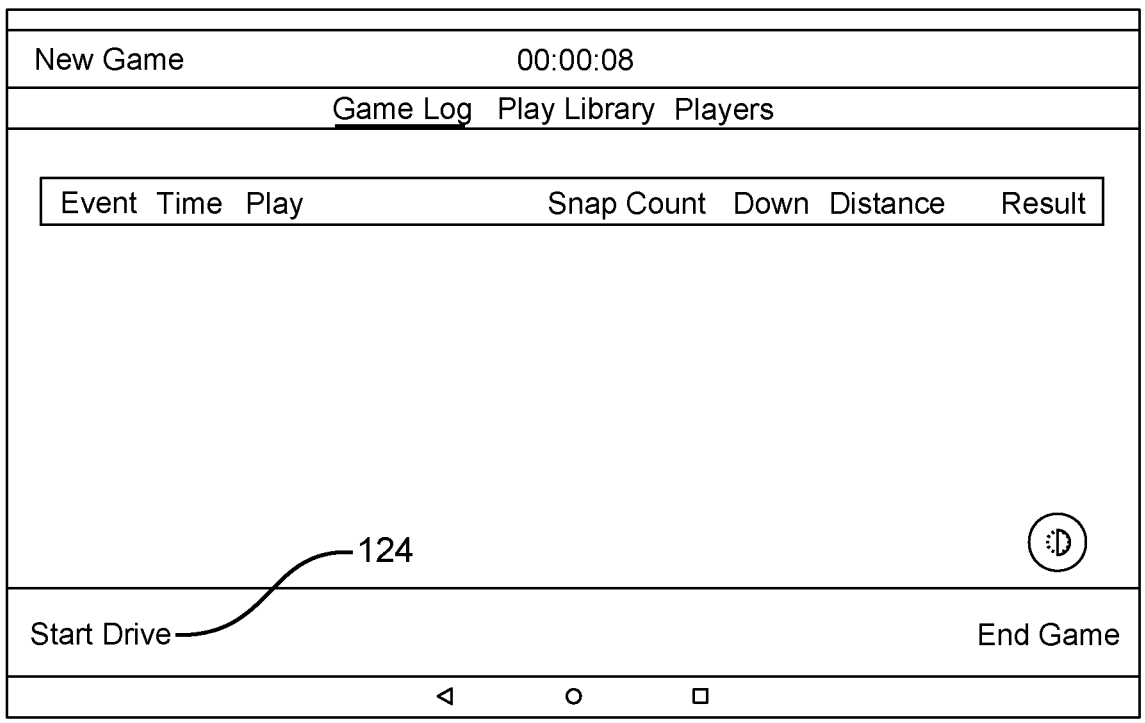
FIG. 18 is a graphical representation of a screen displayed on the handheld user device shown in FIG. 1, showing a Start-Drive button.

Referring to FIGS. 5 and 18, block 122 directs the CPU 56 to start a new drive in response to user invocation of a button 124 for Start Drive (FIG. 18). In the terminology of North American style football sports, a drive is the action of one team and its effect on the football while the football is in that team's possession, and typically consists of a sequence of plays. Each play is typically associated with one play call 92 that is decided by the coach and communicated to the athletic players of that team during pauses between plays.

Referring to FIG. 5, block 126 directs the CPU to select a play call 92.

Referring to FIG. 7, an exemplary method for directing the CPU 56 to perform steps of block 126 (FIG. 5) is shown generally at 78. Method 78 begins execution at block 128, which directs the CPU 56 to determine whether the CPU 56 has received a user invocation of a Checkbox mode.

Figure 19:
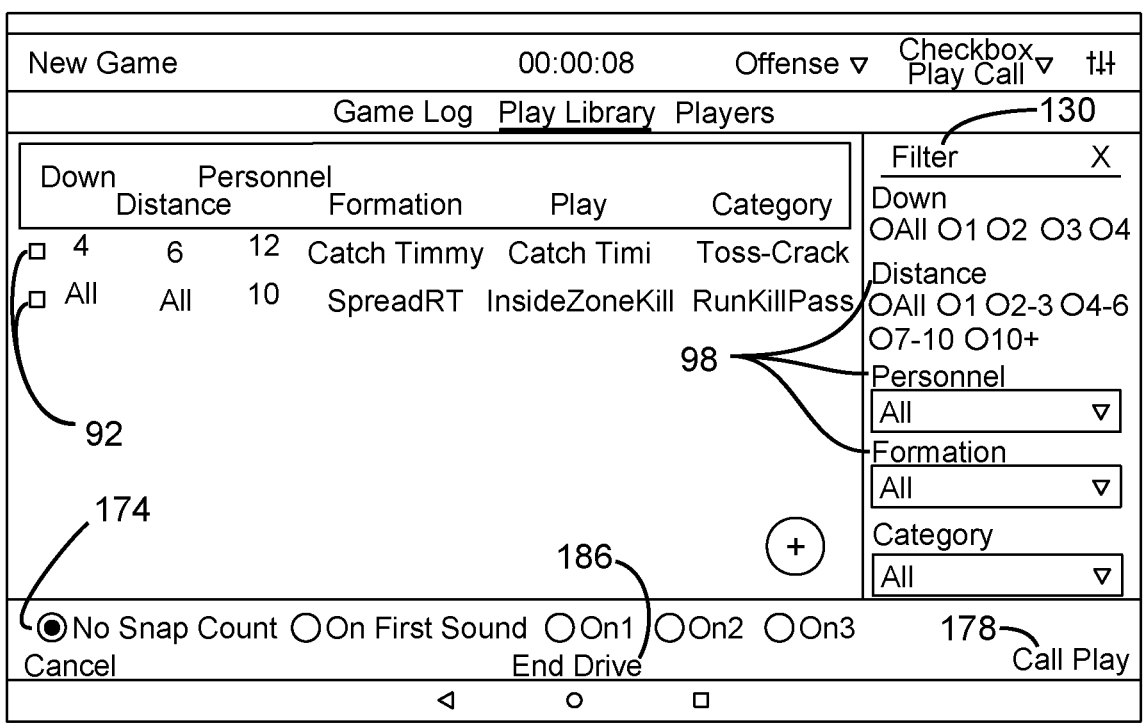
FIG. 19 is a graphical representation of a screen displayed on the handheld user device shown in FIG. 1, showing a Checkbox mode for searching the play library.

If the CPU 56 determines that the user has invoked the Checkbox mode, then as shown in FIG. 19 the CPU 56 is directed to display a checkbox filter 130 for searching among the play calls 92 stored in the play library 94. The checkbox filter 130 includes one or more of the play-call parameters 98 with associated value-entry boxes for receiving user input.

Block 132 directs the CPU 56 to receive user input indicating a selection of filter variables as user-entered values of the play-call parameters 98. Then block 134 directs the CPU 56 to search the play library 94 in response to the filter variables. Block 136 directs the CPU 56 to cause the display 16 to display the play calls 92 located by the search of block 134.

If by block 128 the CPU 56 determines that the user has not invoked the Checkbox mode, then block 138 directs the CPU 56 to determine whether the CPU 56 has received a user invocation of a Tab mode.

If the CPU 56 determines that the user has invoked the Tab mode, then as shown in FIG. 20 the CPU 56 is directed by block 140 (FIG. 7) to display a tab filter 142 that includes one or more categories 144 of the play-call parameters 98 (FIG. 10) for user selection. Block 146 directs the CPU 56 to receive as user input a user selection of one or more categories 144. Then block 148 directs the CPU 56 to search the play library 94 in response to the category selection. In the first embodiment, the search involves locating every play call 92 in the play library 94 that is associated with the selected category. Block 150 directs the CPU 56 to cause the display 16 to display the play calls 92 located by the search of block 148.

If by block 138 the CPU 56 determines that the user has not invoked the Tab mode, then block 152 directs the CPU 56 to determine whether the CPU 56 has received a user invocation of a File mode.

If the CPU 56 determines that the user has invoked the File mode, then block 154 (FIG. 7) directs the CPU 56 to display a list, similar to that shown in FIG. 13, of Constructed Play Sheet(s) 102 that have previously been uploaded to the handheld user device 12 (FIG. 1). Block 156 directs the CPU 56 to receive as user input a selection of one or more displayed Constructed Play Sheets 102. Often a user will only select one Constructed Play Sheet 102 at a time. Block 158 directs the CPU 56 to cause the display 16 to display the play calls 92 included in the selected Constructed Play Sheet(s) 102.

If by block 152 the CPU 56 determines that the user has not invoked the File mode, then block 160 directs the CPU 56 to determine whether the CPU 56 has received a user invocation of a Game-Plan mode.

If the CPU 56 determines that the user has invoked the Game-Plan mode, then block 162 (FIG. 7) directs the CPU 56 to display a list, similar to that shown in FIG. 14, of Game Plan(s) 108 that have been previously created in response to user input and stored at the handheld user device 12 (FIG. 1). Block 164 directs the CPU 56 to receive a user selection of one or more displayed Game Plans 108. Often a user will only select one Game Plan 108 at a time. Block 166 directs the CPU 56 to cause the display 16 to display the play calls 92 included in the selected Game Plan 108.

Upon completion of one of blocks 136, 150, 158, or 166 displaying one or more play calls 92, block 168 directs the CPU 56 to receive as user input a selection of a play call 92 from among the displayed play calls 92.

If by block 160 the CPU 56 determines that the user has not invoked the File mode, then block 170 generates an error code indicating that no mode has been invoked. In variations of embodiments, the system 10 is operable to display an error message; display a dialog box requesting confirmation of user input; wait or continue waiting, including waiting a pre-determined amount of time; other actions; or any combination thereof for example.

Upon executing either block 168 or 170, the CPU 56 is then directed to return to block 172 of FIG. 5.

Referring to FIGS. 5, 19 and 20, block 172 directs the CPU to receive as user input, if any, a selection of an attribute associated with the play call 92 selected by block 126. In the first embodiment, the attribute is a snap count that may be assigned one snap-count value 174 from among the values NO SNAP COUNT, ON FIRST SOUND, ON 1, ON 2, AND ON 3. In the terminology of North American football, a snap count is an indication of when, after the set declaration, the snap will occur. In variations, other suitable attributes associated with the play call 92 may be employed.

Block 176 directs the CPU 56 to receive as user input, if any, the invocation of a button 178 for Call Play, such as shown in FIGS. 19 and 20 for example; and, in response to the user invocation of the Call-Play button 178, to wirelessly transmit the play call 92 selected by block 126 and its associated snap-count value 174, if any, selected by block 172 to the participating wristband devices 38 selected by block 112. In the first embodiment, the system 10 employs digital communication in which a data packet is formed and transmitted by the wireless transceiver 28 (FIG. 4) of the casing 22; the data packet is received by the wireless transceiver 66 of the wristband device 38; the received data packet is parsed by the wireless transceiver 66 and/or wristband CPU 68; and if successfully parsed an acknowledgment is wirelessly transmitted from the wireless transceiver 66 to the wireless transceiver 28.

In the first embodiment, the system 10 is operable to wireless transmit the play call 92 from the handheld user device 12 to each participating wristband device 38 and to wirelessly transmit one acknowledgment from each participating wristband device 38 to the handheld user device 12. In the first embodiment, the system 10 is operable to re-transmit the sports message 18 a predetermined number of times to particular wristband device(s) 38 that did not properly acknowledge receipt of the sports message 18.

In the first embodiment, the system 10 advantageously employs encryption to prevent unauthorized reception of the call play 92 (FIGS. 10 and 12) or other sports message 18 (FIG. 1) being transmitted by the wireless transceiver 28. In embodiments employing encryption, the CPU 56 is directed to encrypt the sports message 18 and to wirelessly transmit the encrypted message 18 from the wireless transceiver 28 to the wireless transceiver 66. In some embodiments, the wristband CPU 68 is directed to encrypt the acknowledgment or other return message and to wirelessly transmit the encrypted return message from the wireless transceiver 66 to the wireless transceiver 28.

In embodiments having a flap 48 detector (not shown), the system 10 is operable to detect that the flap 48 (FIG. 1) has been opened after the sports message 18 has been transmitted from the wireless transceiver 28 to the wireless transceiver 66, and to transmit, from the wireless transceiver 66 to the wireless transceiver 28, a return indicator confirming that the sports message 18 has been read by the athletic player.

After the sports message 18 has been successfully wirelessly transmitted from the handheld user device 12 to each participating wristband device 38, the wristband CPU 68 is directed to display the received sports message 18 on the wristband display 44. In some embodiments, the wristband device 38 is operable to produce an audio sound, such as a beep, and/or an haptic output, such as a vibration, to alert the athletic player that a sports message 18 has been received at the wristband device 38 and is being displayed.

After block 176 has been executed, the athletic players are able to view the sports message 18 on the wristband display 44. Typically, the athletic player will view the displayed sports message 18 and perform athletic maneuvers accordingly such that the coach viewing the football play can learn the result of the play (e.g. touchdown, first down, forward 3 yards, incomplete pass, interception, etc.).

Referring to FIGS. 5, 21 and 22, block 180 directs the CPU 56 to receive as user input, if any, an invocation of an Add-Result button 182 to permit a user to add a result 184 of the play in association with the most recently transmitted play call 92. After the result 184 has been entered by the user, the result 184 is displayed as shown in FIG. 22.

Block 186 directs the CPU 56 to determine whether the CPU 56 has received a user invocation of a button 188 for End Drive.

If the CPU 56 determines that the End-Drive button 188 has not been invoked, then the process returns to block 126 for further processing as described herein above.

Referring to FIGS. 5 and 23, if the CPU 56 determines that the End-Drive button 188 has been invoked by the user, then block 190 directs the CPU 56 to end the drive. As stated herein above, a drive is typically the sequence of plays while the football is in a given team's possession. In the first embodiment, ending the drive involves the CPU 56 no longer accepting user input in respect of the ended drive, and instead waiting for further user input. For example, the Start-Drive button 124 may be invoked following the end of a given drive.

Block 192 directs the CPU 56 to determine whether the CPU 56 has received a user invocation of a button 194 for Half Time as shown in FIG. 22.

If the CPU 56 determines that the Half-Time button 194 has been invoked by the user, then block 196 directs the CPU 56 to set a half-time indicator to true so as to end CPU 56 processing in respect of the first half of the sports game. In the first embodiment, setting the half-time to true involves the CPU 56 no longer accepting user input in respect of the first half of the sports game, and instead waiting for further user input in respect of a second half of the sports game.

After block 196 has been executed, then the process returns to block 122 for further processing as described herein above.

If the CPU 56 determines that the Half-Time button 194 has not been invoked by the user such that the half-time indicator is false, then block 198 directs the CPU 56 to determine whether the CPU 56 has received a user invocation of a button 200 for End Game, which is shown in FIG. 23.

If the CPU 56 determines that the End-Game button 200 has not been invoked, then the process returns to block 122 for further processing as described herein above.

If by block 198 the CPU 56 determines that the End-Game button 200 has been invoked, then the CPU 56 is directed to end the method 74.

At any time before or after a game has been initiated by block 112 of FIG. 5, the system 10 is operable to generate a variety of different reports, such as by user invocation of the Report button 202 shown in FIG. 23. In the first embodiment, examples of reports include half-time report, end-of-game report, seasonal report, historical play calls report, and other similar reports. In some embodiments, statistical data can be generated, such as most (or least) successful play calls 92, most (or least) invoked play calls 92, other statistics, and any combination thereof for example.

Although the blocks of the methods 74, 76, and 78 are illustrated in a sequential order, these blocks may also be performed in parallel, and/or in a different order than those described herein. Also, various blocks may be combined into fewer blocks, divided into additional blocks, and/or removed based upon the desired implementation.

Other Embodiments

While the first embodiment and its variations are primarily directed to applications related to athletics including communications to athletic players of North American style football, the first embodiment is applicable to a wide variety of uses. Also, other embodiments of the invention have wide applicability to many situations involving wireless communications.

Embodiments of the invention are useable in a variety of sports in which a coach or other non-player individual uses the handheld user device 12 to wirelessly communicate a sports message to any number of wristband device(s) 38 worn by player(s) that are participating in the sport. Such sports can include, without limitation, soccer (football), badminton, field hockey, ice hockey, volleyball, basketball, tennis, cricket, table tennis, baseball, golf, and others for example.

Other athletic activities in which a coach or non-player individual can use the handheld user device 12 to wirelessly communicate a sports or other message to an athlete can include, without limitation, marathon running; biathlons; triathlons; racing of vehicles such as race cars, trucks, dune buggies, motorcycles, snowmobiles, and motorboats; mountain climbing; skiing; water rafting; kayaking; sailboarding; sailing; mind sports such as speedcubing; and others for example.

Embodiments of the invention are useable in industrial settings, including in noisy work environments such as at factories, mines, and construction sites. As an additional example, forklift operators in large warehouses work in noisy environments in which written communications to a wearable device such as the wristband device 38 are advantageous over attempts at audio communications. In such industrial settings, a manager or other employee of a business can use the handheld user device 12 to create or select a written or other visual message for sending by wireless communications to any number of workers or other employees of the business who are wearing the wristband device 38. In such applications involving noisy work environments, it is preferable that the system 10 be operable to cause the wristband device 38 to vibrate as an indication that a new message has been received.

Embodiments of the invention are useable in industrial settings in which written communications to a wearable device are preferable to audio communications, such as in quiet or contemplative environments. For example, the wristband device 38 may be worn by librarian workers, hospital workers, funeral workers, workers or volunteers in places of worship, meditation practitioners, or other individuals in quiet environments, to quietly receive a written or other visual communication. In such quiet environments, the wristband device 38 of such embodiments is preferably operable to operate in a vibrate-only mode in which beeping or other audio output is not produced by the wristband device 38.

Embodiments of the invention are useable in settings in which audio-only communications at the wristband device 38 are preferred to written or visual communications. For example, a speedcuber during a timed competition may wish to receive audio-only communications, including beeps; tones; sounds; ringtones or other music; synthetic, real-time or recorded voice communications; etc., in preference to written or visual communications at the wristband device 38 worn by the speedcuber during the timed competition.

In accordance with the full variety of embodiments of the invention, the sports message 18 may include text, graphics, images such as icons or emoticons, videos, audio clips, or any other audio-visual media information in any combination. Thus, the system 10 is operable to communicate a sports message conveying any content or otherwise associated with any subject matter that may be related or unrelated to sports.

Depending on the particular use or application, the wristband device 38 may be adapted for being worn anywhere on the arm such as at the bicep, anywhere on the leg such as at the ankle, or elsewhere on the human body for example.

Depending on the particular use or application, one or more steps of the methods 74, 76, and 78 may be adapted to suit the particular application. The exemplary names and appearances of soft buttons, menu items, and parameters shown in FIGS. 8 to 23 may be adapted. For example, the play call 92 could be a work statement 92, a work task 92, etc.; the Game Plan 108 could be a Work Plan 108, a Work List 108, etc.; and other variations are possible.

While embodiments of the invention have been described and illustrated, such embodiments should be considered illustrative of the invention only. Thus, the embodiments described and illustrated herein should not be considered to limit the invention as construed in accordance with the accompanying claims.

What is claimed is:

1. A system for communicating a sports message, the system comprising:
   (a) an encased portable device comprising:
      (i) a portable computing device having a first processor for processing the sports message, and having a first display;
      (ii) an enclosure external to the portable computing device for supporting the portable computing device and housing a first wireless transceiver external to the portable computing device; and
      (iii) a connector for connecting the portable computing device and the enclosure to each other, the first wireless transceiver being in electrical communication with the first processor via the connector such that the first wireless transceiver is operable to receive the sports message from the first processor; and
   (b) a wearable device comprising a second processor, a second display, and a second wireless transceiver in electrical communication with the second processor,
   wherein the first and second wireless transceivers are cooperatively operable to wirelessly transmit the sports message from the enclosure to the wearable device for display on the second display.

2. The system of claim 1 wherein the wearable device comprises a heater disposed adjacent to the second display for heating the second display.

3. The system of claim 2 wherein the wearable device is operable to sense a temperature at the wearable device, and to heat the second display by the heater in response to the temperature.

4. The system of claim 1 operable to wirelessly transmit encrypted communications between the encased portable device and the wearable device.

5. The system of claim 1 wherein the enclosure further houses an antenna for wireless communications between the first and second wireless transceivers.

6. The system of claim 1 wherein the first processor is operable to receive a user selection of a name for the wearable device, and the first wireless transceiver is operable to wirelessly transmit the name to the second wireless transceiver.

7. The system of claim 1 wherein the enclosure is dimensioned to support the portable computing device while maintaining visibility of the first display, the first display is operable to display a plurality of said sports messages, and the first processor is operable to receive a first user-selection of the sports message from among said plurality of sports messages.

8. The system of claim 7 wherein the first processor is operable to receive a second user-selection of one of: (i) a user-defined category associated with said sports message; (ii) a user-selected search criterion other than said user-defined category; and (iii) a digital file imported into a memory of the portable computing device, and wherein the first processor is further operable to cause the first display to display said plurality of said sports messages in response to said second user-selection.

9. The system of claim 7 wherein the first processor is operable to receive a third user-selection of an attribute and to associate the third user-selection with the first user-selection of the sports message.

10. A method of communicating a sports message, the method comprising:
    (a) establishing wireless communications between an encased portable device and a wearable device when the encased portable device comprises a portable computing device having a first processor and a first display, when the encased portable device further comprises an enclosure external to the portable computing device supporting the portable computing device and housing a first wireless transceiver that is external to the portable computing device and is in electrical communication with the first processor via a connector connected between the portable computing device and the enclosure such that the wireless transceiver is operable to receive the sports message from the first processor, and when the wearable device comprises a second processor, a second display, and a second wireless transceiver in electrical communication with the second processor;
    (b) receiving by the first processor a first user-selection of the sports message;
    (c) wirelessly transmitting the sports message by the first wireless transceiver to the second wireless transceiver; and
    (d) displaying the sports message on the second display.

11. The method of claim 10 further comprising: (e) heating the second display by a heater disposed adjacent to the second display.

12. The method of claim 11 wherein step (e) comprises sensing, by the wearable device, a temperature at the wearable device.

13. The method of claim 10 wherein step (c) comprises encrypting the sports message into an encrypted communication and wirelessly transmitting the encrypted communication.

14. The method of claim 10 further comprising:
    (f) receiving by the first processor a user selection of a name for the wearable device; and
    (g) wirelessly transmitting the name from the first wireless transceiver to the second wireless transceiver.

15. The method of claim 10 wherein step (b) comprises receiving by the first processor a second user-selection of one of: (i) a user-defined category associated with the sports message, (ii) a user-selected search criterion other than said user-defined category, and (iii) a digital file imported into a memory of the portable computing device; and wherein step (b) further comprises displaying on the first display a plurality of said sports messages in response to said second user-selection when the enclosure is dimensioned to support the portable computing device while maintaining visibility of the first display.

16. The method of claim 10 wherein step (b) comprises receiving by the first processor a second user-selection of an attribute, and further comprises associating the second user-selection with the first user-selection.

17. A system for communicating a sports message, the system comprising:
   (a) means for receiving a first user-selection of the sports message at an encased portable device;
   (b) wireless transmission means for wirelessly transmitting the sports message from the encased portable device to a wearable device; and
   (c) display means for displaying the sports message at the wearable device.

18. The system of claim 17 further comprising means for heating the display means.

19. The system of claim 17 further comprising means for receiving a user-selection of a name for the wearable device, the wireless transmission means being operable to transmit the name from the encased portable device to the wearable device.

20. The system of claim 17 further comprising means for receiving a second user-selection of an attribute and associating the second user-selection with the first user-selection.

* * * * *